(12) United States Patent
Harada et al.

(10) Patent No.: US 11,848,633 B2
(45) Date of Patent: Dec. 19, 2023

(54) CONTROLLER FOR AC ROTARY ELECTRIC MACHINE

(71) Applicant: Mitsubishi Electric Corporation, Tokyo (JP)

(72) Inventors: Shingo Harada, Tokyo (JP); Keiichi Enoki, Tokyo (JP); Nozomu Kamioka, Tokyo (JP); Tomohisa Shoda, Tokyo (JP); Yoshimasa Nishijima, Tokyo (JP); Kazuhiko Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 17/271,280

(22) PCT Filed: Nov. 20, 2018

(86) PCT No.: PCT/JP2018/042777
§ 371 (c)(1),
(2) Date: Feb. 25, 2021

(87) PCT Pub. No.: WO2020/105106
PCT Pub. Date: May 28, 2020

(65) Prior Publication Data
US 2021/0257954 A1    Aug. 19, 2021

(51) Int. Cl.
*H02P 27/08* (2006.01)
*H02P 21/00* (2016.01)
*H02P 21/22* (2016.01)

(52) U.S. Cl.
CPC ........ *H02P 27/085* (2013.01); *H02P 21/0021* (2013.01); *H02P 21/22* (2016.02)

(58) Field of Classification Search
CPC ............. H02M 1/385; H02M 7/53875; H02M 7/5395; H02M 7/48; H02M 1/00;
(Continued)

(56) References Cited

U.S. PATENT DOCUMENTS

2005/0105569 A1* 5/2005 Senga .................... G11B 7/126
2006/0006834 A1* 1/2006 Suzuki ................... H02P 6/085
318/801
(Continued)

FOREIGN PATENT DOCUMENTS

JP    2006-025499 A    1/2006
JP    4681453 B2       5/2011
(Continued)

OTHER PUBLICATIONS

Yura (JP H07308071 A) (Controller of Inverter) Date Published Nov. 21, 1995 (Year: 1995).*
(Continued)

*Primary Examiner* — Jorge L Carrasquillo
(74) *Attorney, Agent, or Firm* — Sughrue Mion, PLLC; Richard C. Turner

(57) ABSTRACT

To provide a controller for AC rotary electric machine which can compensate error of the actual on-duty with respect to the command on-duty calculated from command voltage with good accuracy, with a simple circuit configuration. A controller for AC rotary electric machine detects an actual on-duty of the switching device based on the detection value of the midpoint potential which is the potential of the connection node of the series connection in the series circuit; calculates an on-duty error based on the difference between the command on-duty and the actual on-duty; and corrects the voltage command or the command on-duty based on the on-duty error.

12 Claims, 10 Drawing Sheets

(58) Field of Classification Search
CPC ...... H02P 21/0021; H02P 21/22; H02P 27/08;
H02P 27/085; H02P 21/00; Y02T 10/12;
A01B 69/00; A01D 41/00; A01D 41/12;
A01D 69/00; A01D 75/18; A01F 12/10;
A01F 17/02; F01N 5/00; F01N 5/04
USPC .................................................. 318/400.13
See application file for complete search history.

(56) References Cited

U.S. PATENT DOCUMENTS

| | | | |
|---|---|---|---|
| 2007/0029959 | A1 | 2/2007 | Ta et al. |
| 2015/0249386 | A1* | 9/2015 | Maede ................. H02M 3/157 323/271 |
| 2018/0278191 | A1 | 9/2018 | Matsumuro et al. |
| 2019/0241208 | A1 | 8/2019 | Takase et al. |
| 2019/0329817 | A1 | 10/2019 | Takase et al. |

FOREIGN PATENT DOCUMENTS

| | | |
|---|---|---|
| JP | 2015-211487 A | 11/2015 |
| JP | 6319532 B2 | 5/2018 |
| JP | 2018-164325 A | 10/2018 |

OTHER PUBLICATIONS

International Search Report of PCT/JP2018/042777 dated Feb. 19, 2019 [PCT/ISA/210].

Notice of Reasons for Refusal dated Sep. 28, 2021 by the Japanese Patent Office in Japanese Application No. 2020-557054 English Translation.

Office Action dated Jun. 25, 2023 in Chinese Application No. 201880099549.7.

* cited by examiner

FIG. 11

| SELECTOR | $\theta_{est\eta}$ [deg] | SETTING PHASE OF CURRENT POSITIVE SIDE | SETTING PHASE OF CURRENT NEGATIVE SIDE |
|---|---|---|---|
| 0 | 0 ~ 60 | U | V |
| | 60 ~ 120 | U | V |
| | 120 ~ 180 | U | W |
| | 180 ~ 240 | V | U |
| | 240 ~ 300 | W | U |
| | 300 ~ 360 | W | U |
| 1 | 0 ~ 60 | W | V |
| | 60 ~ 120 | U | W |
| | 120 ~ 180 | V | W |
| | 180 ~ 240 | V | W |
| | 240 ~ 300 | V | U |
| | 300 ~ 360 | W | V |

CONTROLLER FOR AC ROTARY ELECTRIC MACHINE

CROSS REFERENCE TO RELATED APPLICATIONS

This application is a National Stage of International Application No. PCT/JP2018/042777 filed on Nov. 20, 2018.

TECHNICAL FIELD

The present disclosure relates to a controller for AC rotary electric machine.

BACKGROUND ART

An electric motor vehicle, such as an electric vehicle and a hybrid vehicle, mounts an AC rotary electric machine as a driving source of the vehicle. An inverter converts DC power supplied from the DC power source into AC power, and supplies to the AC rotary electric machine. The inverter is provided with switching devices, such as MOSFET (Metal Oxide Semiconductor Field Effect Transistor).

The switching device ordinary has a time delay of turn-on delay and turn-off delay. Therefore, if switching of turning on and off of the positive electrode side switching device and the negative electrode side switching device is performed at the same time, the positive electrode side and the negative electrode side switching device may short-circuit. In order to prevent this short circuit, the dead time in which both switching devices are turned off is provided between the on period of the positive electrode side switching device and the on period of the negative electrode side switching device. If the dead time is provided, an error occurs in the actual on-duty with respect to the command on-duty of the switching device calculated from the voltage command.

In the technology disclosed in PLT 1, in order to compensate the on-duty error due to the dead time, the compensation of the dead time is performed by the feedforward control which uses the reference model circuit of the current control loop and the current command value.

In the technology disclosed in PLT 2, the correction command voltage is calculated based on the duty command value, the detection voltage is estimated based on the terminal voltage of winding, the loss voltage due to the dead time is estimated from the difference, and the dead time compensation is performed by feeding back the dead time compensation value to dq-axis current command values.

CITATION LIST

Patent Literature

PLT 1: JP 4681453 B
PLT 2: JP 6319532 B

SUMMARY OF INVENTION

Technical Problem

However, in the technology of PLT 1, it is necessary to determine the threshold value of the reference model circuit. In order to improve compensation accuracy, it is required to switch the threshold value in various conditions, and there is a problem that tuning work with the real machine is required.

In the technology of PLT 2, in order to estimate the detection voltage based on the terminal voltage of the motor, the voltage detection circuit is required. In order to secure detection accuracy, the filter circuit for eliminating the extraneous noise is also required, and there is a problem that circuit scale becomes large. Furthermore, there is a problem that the load of calculation processing increases for estimation of the detection voltage and estimation of the loss voltage.

Thus, it is desirable to provide a controller for AC rotary electric machine which can compensate error of the actual on-duty with respect to the command on-duty calculated from command voltage with good accuracy, with a simple circuit configuration.

Solution to Problem

A controller for AC rotary electric machine according to the present disclosure is a controller for AC rotary electric machine that controls an AC rotary electric machine which is provided with n-phase windings (n is a natural number of greater than or equal to two), the controller for AC rotary electric machine including:

an inverter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a midpoint potential detection circuit that detects a midpoint potential which is a potential of the connection node of series connection in the series circuit of each phase; and a control circuit that controls on/off of the switching devices, based on command on-duties calculated from voltage commands, or the voltage commands, wherein the control circuit detects an actual on-duty of the switching device, based on a detection value of the midpoint potential, calculates an on-duty error based on a difference between the command on-duty and the actual on-duty, and corrects the voltage command or the command on-duty based on the on-duty error.

Advantage of Invention

According to the controller for AC rotary electric machine of the present disclosure, based on the detection value of midpoint potential, the actual on-duty can be detected and the on-duty error can be calculated. Then, by correcting the voltage command or the command on-duty based on the on-duty error, the switching device can be turned on or turned off as the command, and the control accuracy of the voltage applied to the winding can be improved. Since the detection value of the midpoint potential by the midpoint potential detection circuit is used, the on-duty error can be detected by a simple circuit configuration.

BRIEF DESCRIPTION OF THE DRAWINGS

FIG. 11 is a figure for explaining setting of time division according to Embodiment 4.

DETAILED DESCRIPTION OF THE EMBODIMENTS

1. Embodiment 1

Figure 1:
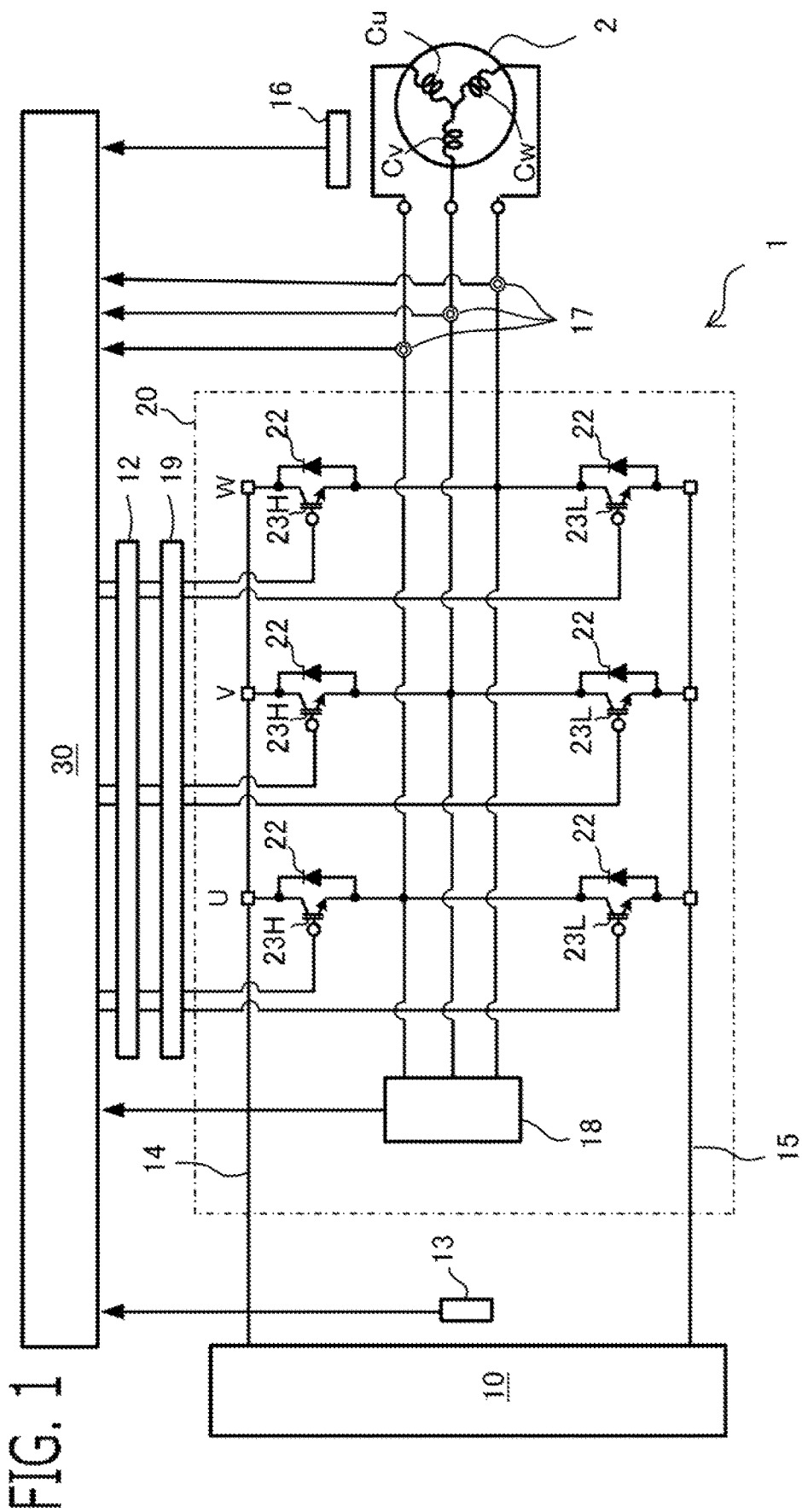
FIG. 1 is a schematic configuration diagram of the AC rotary electric machine and the controller for AC rotary electric machine according to Embodiment 1.

A controller for AC rotary electric machine (hereinafter, referred to simply as the controller 1) according to Embodiment 1 will be explained with reference to drawings. FIG. 1 is a schematic configuration diagram of the AC rotary electric machine 2 and the controller 1 according to the present embodiment.

1-1. AC Rotary Electric Machine

The AC rotary electric machine 2 is provided with n-phase windings (n is a natural number of greater than or equal to two). In the present embodiment, the AC rotary electric machine 2 is a permanent magnet type synchronous AC rotary electric machine, and is provided with a stator having the n-phase windings, and a rotor having permanent magnets. In the present embodiment, it is n=3, and it is three-phase of U phase, V phase, and W phase. The stator is provided with three-phase windings Cu, Cv, Cw. The three-phase windings Cu, Cv, Cw are connected by star connection. The three-phase windings may be connected by delta connection.

The AC rotary electric machine 2 is provided with a rotation sensor 16 which outputs an electric signal according to a rotational angle of the rotor. The rotation sensor 16 is a Hall element, an encoder, or a resolver. An output signal of the rotation sensor 16 is inputted into the control circuit 30.

1-2. Controller 1

The controller 1 is provided with an inverter 20, a source voltage detection circuit 13, a current detection circuit 17, a midpoint potential detection circuit 18, a gate drive circuit 12, a redundant three-phase short circuit 19, and a control circuit 30.

1-2-1. Inverter and the Like

The inverter 20 is provided with a plurality of switching devices and performs a DC/AC conversion between a DC power source 10 and the three-phase windings. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in each phase of the series circuit, the collector terminal of the positive electrode side switching device 23H is connected to the positive electrode side wire 14, the emitter terminal of the positive electrode side switching device 23H is connected to the collector terminal of the negative electrode side switching device 23L, and the emitter terminal of the negative electrode side switching device 23L is connected to the negative electrode side electric wire 15. The connection node between the positive pole side switching device 23H and the negative pole side switching device 23L is connected to the winding of the corresponding phase.

As the switching device, a switching device which has a function of a diode connected in inverse parallel is used. For example, an IGBT (Insulated Gate Bipolar Transistor) in which a diode 22 is connected in inverse parallel, a MOSFET (Metal Oxide Semiconductor Field Effect Transistor) which has a parasitic diode connected in inverse parallel, or the like is used.

<Gate Drive Circuit 12>

The gate drive circuit 12 drives on/off of the switching devices. The gate drive circuit 12 is connected to a gate terminal of each switching device via a redundant three-phase short circuit 19. The gate drive circuit 12 outputs an ON signal or an OFF signal to each switching device according to the control signal transmitted from the control circuit 30 via the photo coupler and the like, and turns on or turns off the each switching device.

<Redundant Three-Phase Short Circuit 19>

The redundant three-phase short circuit 19 forcibly short-circuits or opens (ON or OFF) each switching device according to the command signal from the control circuit 30 and the like. The switching devices which are short-circuited or opened may be the positive electrode side switching devices of three-phase, may be the negative electrode side switching devices of three-phase, and, alternatively may be all the switching devices.

<Current Detection Circuit 17>

The current detection circuit 17 detects a winding current which flows into the winding of each phase. The current detection circuit 17 outputs an electric signal according to winding current, and the output signal is inputted into the control circuit 30. In the present embodiment, the current detection circuit 17 is the Hall elements and the like, which are provided on the wire of each phase which connects the connection node of the series circuit of the switching devices and the winding. Alternatively, the current detection circuit 17 may be the shunt resistances connected in series to the series circuit of each phase.

<Midpoint Potential Detection Circuit 18>

The midpoint potential detection circuit 18 detects a midpoint potential which is a potential of the connection node between the positive electrode side switching device and the negative electrode side switching device in the series circuit. The current detection circuit 17 outputs an electric signal according to the midpoint potential, and the output signal is inputted into the control circuit 30. In the present embodiment, the midpoint potential detection circuit 18 detects the midpoint potential of the connection node of the series circuit of each phase of three-phase.

In the present embodiment, the midpoint potential detection circuit 18 is a circuit which turns on or turns off the output signal, according to whether the midpoint potential is larger or smaller than a potential threshold value. The midpoint potential detection circuit 18 turns on the output signal, when the midpoint potential is larger than the potential threshold value; and turns off the output signal, when the midpoint potential is smaller than the potential threshold value. The potential threshold value is set to a voltage within a range from 0 to the power source voltage Vdc (for example, ½ of the power source voltage Vdc). Different potential thresholds may be used in rising and falling of the midpoint potential. The midpoint potential detection circuit 18 may be constituted of a simple circuit, such as a comparator which compares the midpoint potential with the potential threshold value.

<Source Voltage Detection Circuit 13>

The source voltage detection circuit 13 detects a power source voltage Vdc of the DC power source 10 supplied to the inverter 20. The source voltage detection circuit 13 outputs an electric signal according to the power source voltage Vdc, and the output signal is inputted into the control circuit 30.

<DC Power Source 10>

A chargeable and dischargeable electricity accumulation device (for example, a lithium ion battery, a nickel hydride battery, an electrical double layer capacitor) is used for the DC power source 10. A DC-DC converter which is a DC electric power converter which steps up or steps down the DC voltage may be provided in the DC power source 10. A smoothing capacitor may be connected between the positive electrode side wire 14 and the negative electrode side wire 15 of the inverter 20.

1-2-2. Control Circuit 30

Figure 2:
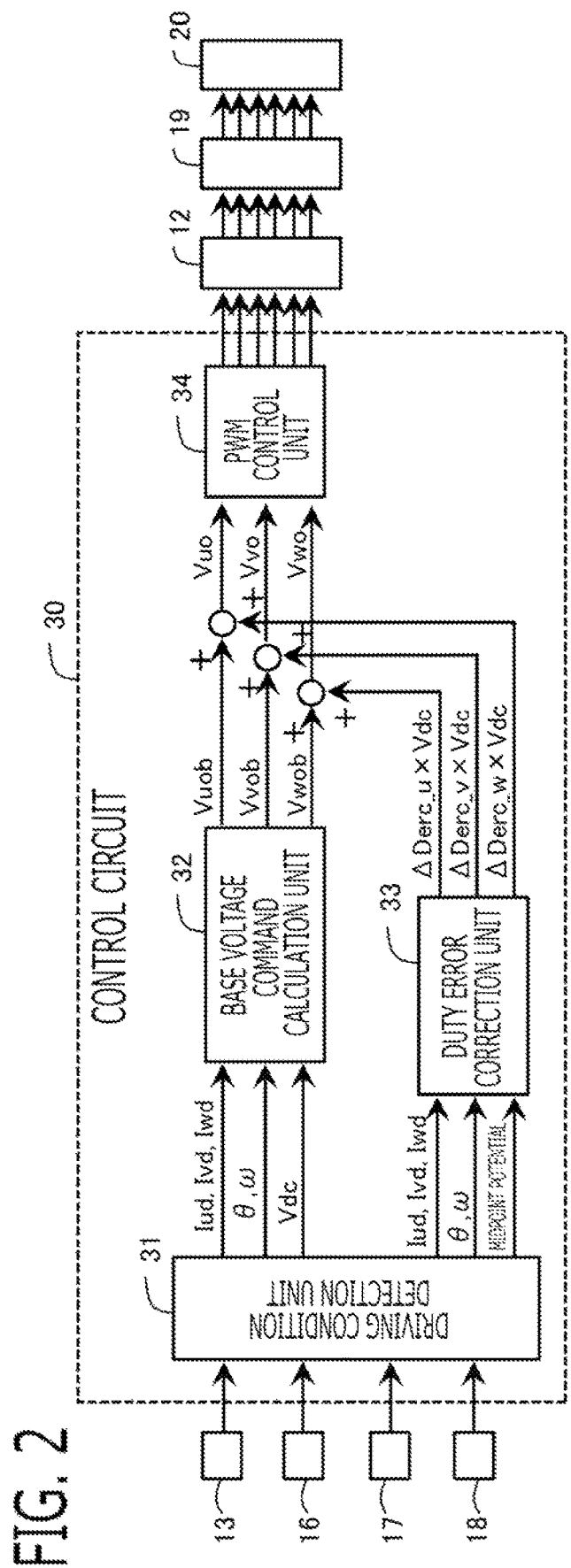
FIG. 2 is a block diagram of the control circuit according to Embodiment 1.
Figure 3:
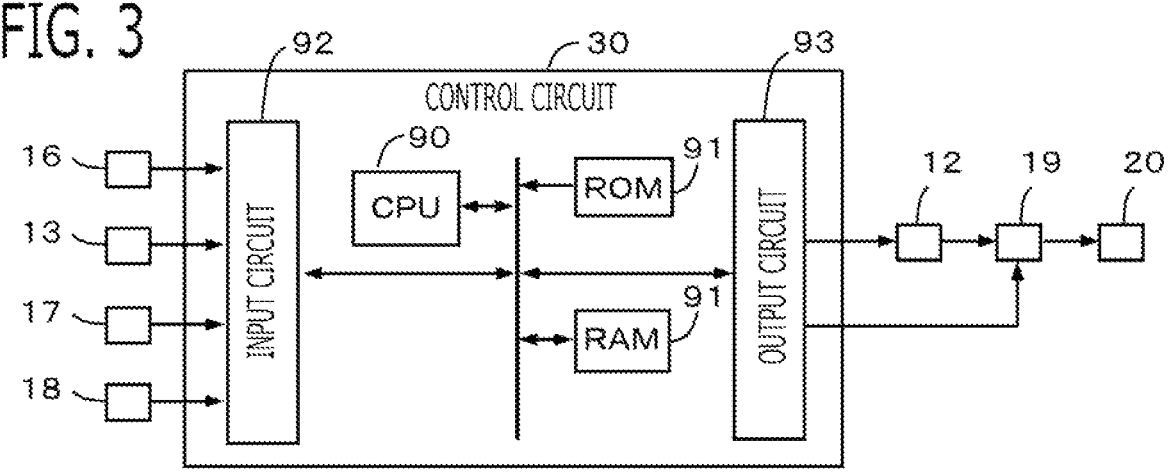
FIG. 3 is a hardware configuration diagram of the control circuit according to Embodiment 1.

The control circuit 30 controls the AC rotary electric machine 2 by controlling the inverter 20. As shown in FIG. 2, the control circuit 30 is provided with a driving condition detection unit 31, a base voltage command calculation unit 32, a duty error correction unit 33, a PWM control unit 34, and the like, which are described below. Each function of the control circuit 30 is realized by processing circuits provided in the control circuit 30. Specifically, as shown in FIG. 3, the control circuit 30 is provided, as processing circuits, with an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the rotation sensor 16, the source voltage detection circuit 13, the current detection circuit 17, and the midpoint potential detection circuit 18, and is provided with A/D converter, input port, and the like for inputting output signals from the sensors and the switches to the arithmetic processor 90. The output circuit 93 is connected with electric loads such as the gate drive circuit 12, and the redundant three-phase short circuit 19, and is provided with output port, driving circuit, and the like for outputting a control signal from the arithmetic processor 90.

Then, the arithmetic processor 90 runs software items (programs) stored in the storage apparatus 91 such as a ROM and collaborates with other hardware devices in the control circuit 30, such as the storage apparatus 91, the input circuit 92, and the output circuit 93, so that the respective functions of the control units 31 to 34 of FIG. 2 included in the control circuit 30 are realized. Setting data items such as a threshold value to be utilized in the control units 31 to 34 are stored, as part of software items (programs), in the storage apparatus 91 such as a ROM. Each function of the control circuit 30 will be described in detail below.

1-2-2-1. Driving Condition Detection Unit 31

The driving condition detection unit 31 detects the power source voltage Vdc based on the output signal of the source voltage detection circuit 13. The driving condition detection unit 31 detects the winding currents Iud, Ivd, Iwd which flow into three-phase windings, based on the output signal of the current detection circuit 17. The driving condition detection unit 31 detects a rotational angle θ (a magnetic pole position θ) and a rotational angle speed co of the rotor based on the output signal of the rotation sensor 16. The driving condition detection unit 31 detects the midpoint potentials based on the output signal of the midpoint potential detection circuit 18. The driving condition detection unit 31 detects the winding currents, the magnetic pole position θ, and rotational angle speed co, at timing (start time point of PWM calculation cycle) of one or both of the peak of mountain and the peak of valley of the carrier wave CA (in this example, the peak of mountain of the carrier wave CA).

1-2-2-2. Base Voltage Command Calculation Unit 32

The base voltage command calculation unit 32 calculates base voltage commands of three-phase Vuob, Vvob, Vwob which are voltage commands of three-phase before being corrected by the duty error correction part 33 described below. For example, the base voltage command calculation unit 32 calculates the base voltage commands of three-phase Vuob, Vvob, Vwob using well-known vector control.

In the present embodiment, the base voltage command calculation unit 32 calculates the base voltage commands of three-phase Vuob, Vvob, Vwob by a current feedback control which controls the currents which flows into the windings on a dq-axis rotating coordinate system. The dq-axis rotating system consists of a d-axis defined in a direction of the N pole (magnetic pole position) of the permanent magnet provided in the rotor and a q-axis defined in a direction advanced to d-axis by 90 degrees ($\pi/2$) in an electrical angle, and which is a two-axis rotating coordinate system which rotates synchronizing with rotation of the rotor in the electrical angle.

The details will be explained below. The base voltage command calculation unit 32 calculates a d-axis current command Ido and a q-axis current command Iqo according to a current vector control method, such as a maximum torque/current control, a magnetic flux weakening control, or Id=0 control, based on a target torque, the power source voltage, the rotational speed, and the like. The target torque may be transmitted from an external device, or may be calculated in the base voltage command calculation unit 32.

The base voltage command calculation unit 32 converts the current detection values of three-phase windings Iud, Ivd, Iwd into a d-axis current detection value Idd and a q-axis current detection value Iqd which are represented in the dq-axis rotating coordinate system, by performing a three-phase/two-phase conversion and a rotating coordinate conversion based on the magnetic pole position θ.

The base voltage command calculation unit 32 performs a feedback control which changes a d-axis voltage command Vdo and a q-axis voltage command Vqo by PI control and the like so that the dq-axis current detection values Idd, Iqd approach the dq-axis current commands Ido, Iqo.

The base voltage command calculation unit 32 converts the dq-axis voltage commands Vdo, Vqo into the base voltage commands of three-phase Vuob, Vvob, Vwob, by performing a fixed coordinate conversion and a two-phase/three-phase conversion based on the magnetic pole position θ. As the base voltage commands of three-phase Vuob, Vvob, Vwob, the commands to which a modulation such as a third order harmonic wave injection is applied may be used.

1-2-2-3. PWM Control Unit 34

The PWM control unit 34 controls on/off of the positive electrode side and the negative electrode side switching devices of each phase by PWM control (Pulse Width Modulation). In the present embodiment, the PWM control unit 34 controls on/off of each switching device based on each phase of the voltage commands of three-phase Vuo, Vvo, Vwo after performing correction to the base voltage commands of three-phase Vuob, Vvob, Vwob by the duty error correction part 33 described below. The voltage commands of three-phase Vuo, Vvo, Vwo are calculated in the PWM calculation cycle which is a period between the timings of one or both of the peak of mountain and the peak of valley of the carrier wave CA (in this example, the peak of mountain of the carrier wave CA), and are updated at the end time point of the PWM calculation cycle.

The PWM control unit 34 generates the PWM signals of three-phase which turn on and off at the PWM period Tcc and command on-duties of three-phase Do_u, Do_v, Do_w, based on the voltage commands of three-phase Vuo, Vvo, Vwo, respectively. As shown in the equation (1) described below, values obtained by adding 0.5 to values obtained by dividing the voltage commands of three-phase Vuo, Vvo, Vwo by the power source voltage Vdc become the command on-duties of three-phase Do_u, Do_v, Do_w, respectively. The command on-duty Do is corresponding to the on-duty of the positive electrode side switching device.

Figure 4:
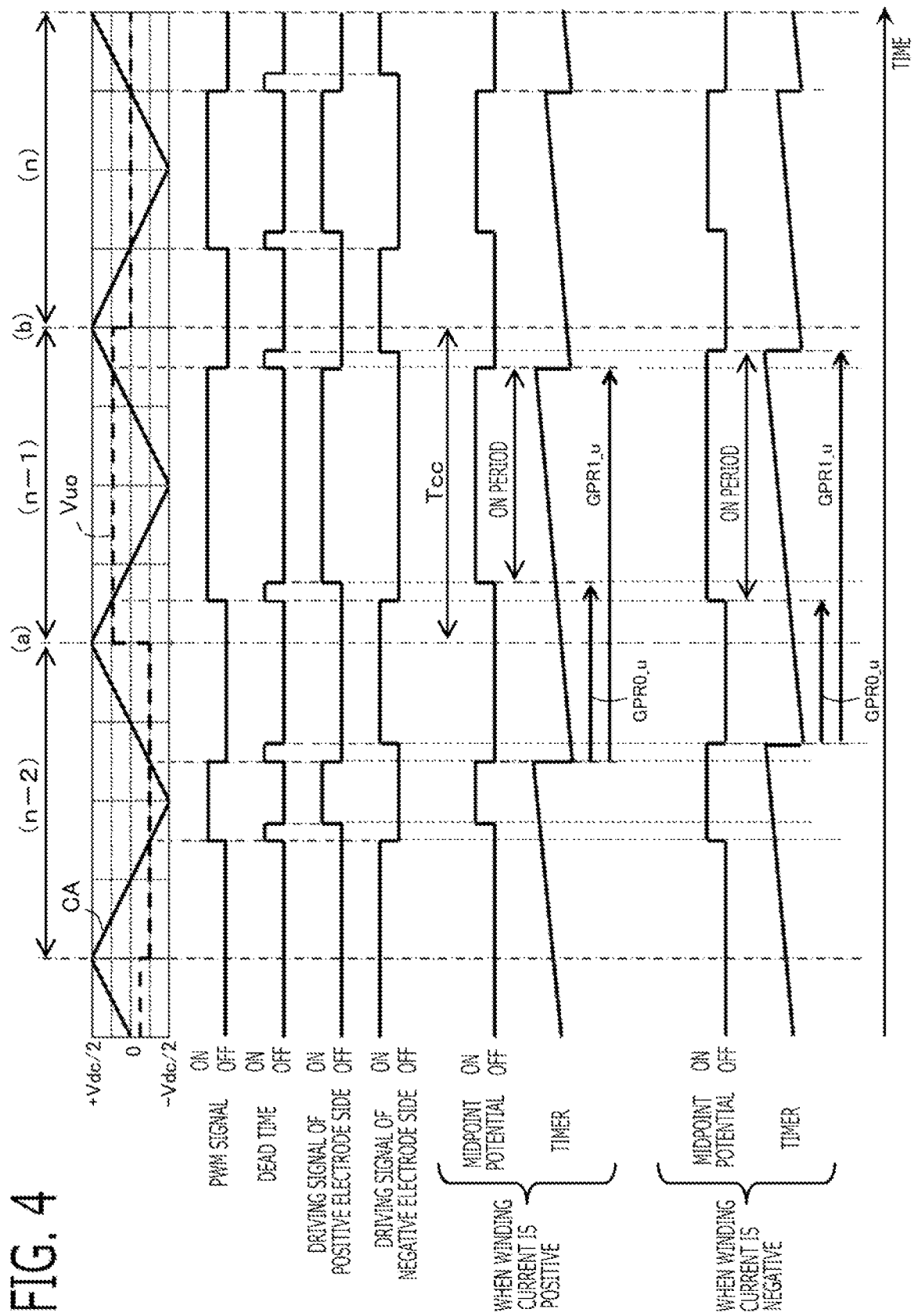
FIG. 4 is a time chart for explaining a control behavior according to Embodiment 1.

In the present embodiment, the PWM control unit 34 generates the PWM signal which turns each switching device on and off, based on a comparison result between each phase of the voltage commands of three-phase Vuo, Vvo, Vwo and the carrier wave CA. As shown in FIG. 4, the carrier wave CA is a triangular wave which vibrates with an amplitude of ½ of the power source voltage Vdc centering on 0 with the PWM period Tcc. The PWM control unit 34 turns on the PWM signal, when the voltage command exceeds the carrier wave CA; and turns off the PWM signal, when the voltage command is below the carrier wave CA. If the dead time described below is ignored, about each phase, when the PWM signal is on, the control signal of the positive electrode side switching device becomes on, and the control signal of the negative electrode side switching device becomes off; and when the PWM signal is off, the control signal of the positive electrode side switching device becomes off, and the control signal of the negative electrode side switching device becomes on.

<Dead Time>

In the present embodiment, about each phase, the PWM control unit 34 turns on the positive electrode side switching device and the negative electrode side switching device alternately, while interposing the dead time. That is to say, about each phase, the PWM control unit 34 sets the dead time in which both of the positive electrode side and the negative electrode side switching device become off, between the on driving period of the positive electrode side switching device and the on driving period of the negative electrode side switching device.

In the present embodiment, about each phase, the PWM control unit 34 shortens the on driving period of the positive electrode side switching device less than the on driving period corresponding to the command on-duty Do, by the dead time; and lengthens the off driving period of a negative electrode side switching device by the dead time more than the off driving period corresponding to a duty obtained by subtracting the command on-duty Do from 1.

As the behavior of U phase is shown in FIG. 4, about each phase, the PWM control unit 34 generates the PWM signal which turns on and off at the command on-duty Do, as mentioned above. Then, about each phase, the PWM control unit 34 turns off the negative electrode side switching device, when the PWM signal becomes on; turns on the positive electrode side switching device, when the dead time elapses after the PWM signal becomes on; turns off the positive electrode side switching device, when the PWM signal becomes off; and turns off the negative electrode side switching device, when the dead time elapses after the PWM signal becomes off.

1-2-2-4. Duty Error Correction Unit 33

Between the command on-duty Do and the actual on-duty Dr, an error occurs due to various kinds of factors. Then, the duty error correction unit 33 detects an on-duty error ΔDer, and corrects each of the voltage commands of three-phase based on the on-duty error ΔDer. In the present embodiment, the duty error correction unit 33 calculates the voltage commands of three-phase Vuo, Vvo, Vwo by correcting the base voltage commands of three-phase Vuob, Vvob, Vwob based on the on-duty error ΔDer. First, factors of the on-duty error will be explained.

<Fluctuation of the Actual On-Duty Dr Due to the Positive/Negative of Winding Current>

Since, even during the period of the dead time, current flows through the diode, which is connected in inverse parallel and is provided in the positive electrode side or the negative electrode side switching device, according to positive or negative of the winding current, the actual on-duty Dr of the positive electrode side switching device is fluctuated.

Figure 5:
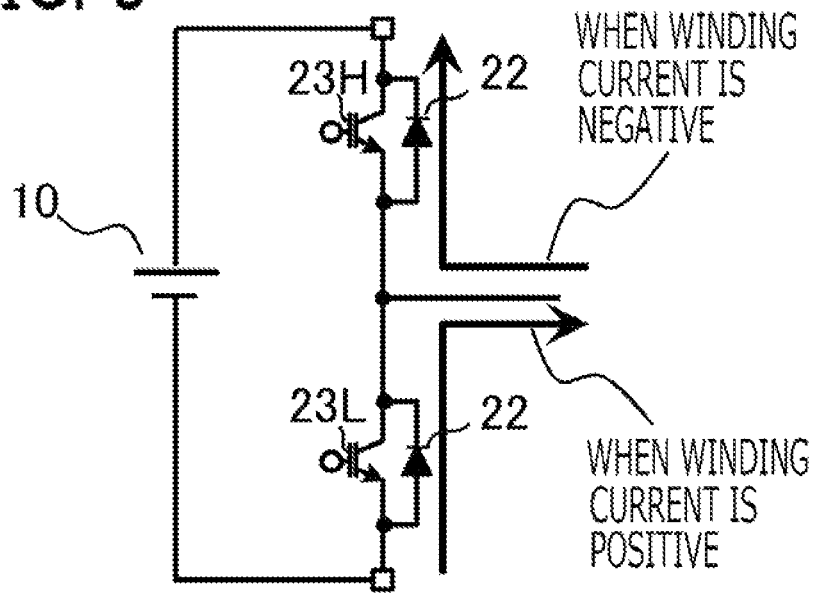
FIG. 5 is a figure for explaining positive/negative of the winding current and on/off of the switching device during the period of the dead time according to Embodiment 1.

As shown in FIG. 5, when the winding current is positive during the period of the dead time, since current flows through the diode 22 of the negative electrode side switching device 23L, the negative electrode side switching device 23L becomes on actually, and the actual on period of the negative electrode side becomes longer than the on driving period, by a double value of the dead time. On the other hand, since the positive electrode side switching device 23H is still actually off during the period of the dead time, the actual on period of the positive electrode side is still the on driving period. During the period of the dead time, since the midpoint potential of the connection node between the positive electrode side switching device 23H and the negative electrode side switching device 23L electrically conducts with the negative electrode side of the DC power source 10, it becomes a potential equivalent to the negative electrode side of the DC power source 10 (in this example, 0, off).

Therefore, when the winding current is positive, the actual on-duty Dr of the positive electrode side switching device 23H is still the driving on-duty, and decreases less than the command on-duty Do, by the on-duty corresponding to the dead time. As shown in FIG. 4, in this case, a period when the positive electrode side switching device 23H becomes on actually can be detected when the midpoint potential becomes a potential equivalent to the positive electrode side of the DC power source 10 (in this example, the power source voltage Vdc, on).

On the other hand, as shown in FIG. 5, when the winding current is negative during the period of the dead time, since current flows through the diode 22 of the positive electrode side switching device 23H, the positive electrode side switching device 23H becomes on actually, and the actual on period of the positive electrode side becomes longer than the on driving period, by a double value of the dead time. On the other hand, since the negative electrode side switching device 23L is still actually off during the period of the dead time, the actual on period of the negative electrode side is still the on driving period. During the period of the dead time, since the midpoint potential electrically conducts with the positive electrode side of the DC power source 10, it becomes a potential equivalent to the positive electrode side of the DC power source 10 (in this example, the power source voltage Vdc, on).

Therefore, when the winding current is negative, the actual on-duty Dr of the positive electrode side switching device 23H increases more than the driving on-duty, by the on-duty corresponding to the double value of the dead time, and increases more than the command on-duty Do, by the on-duty corresponding to the dead time. As shown in FIG. 4, in this case, a period when the positive electrode side switching device 23H becomes on actually can be detected when the midpoint potential becomes a potential equivalent to the positive electrode side of the DC power source 10 (in this example, the power source voltage Vdc, on).

<Fluctuation of the Actual On-Duty Dr Due to Turn-Off Delay and Turn-on Delay>

Since there is a time when current flows through the switching device continuously even after turning off the PWM signal, there is a time lag until the switching device turns off actually (hereinafter, referred to as a turn-off delay). Even after turning on the PWM signal, there is a time lag until the switching device turns on actually (hereinafter, referred to as a turn-on delay). The turn-off delay and the turn-on delay change according to the magnitude of the winding current. Also, in this case, a period when the positive electrode side switching device 23H becomes on actually can be detected when the midpoint potential becomes a potential equivalent to the positive electrode side of the DC power source 10 (in this example, the power source voltage Vdc, on).

<Correction by Detected On-Duty Error ΔDer>

Then, the duty error correction unit 33 detects an actual on-duty Dr of the switching device, based on the detection value of the midpoint potential, and calculates an on-duty error ΔDer based on a difference between the command on-duty Do calculated based on the voltage command, and the actual on-duty Dr. Then, the duty error correction unit 33 corrects the voltage command based on the on-duty error ΔDer.

According to this configuration, based on the detection value of midpoint potential, the actual on-duty Dr can be detected and the on-duty error ΔDer can be calculated. Then, by correcting the voltage command based on the on-duty error ΔDer, the switching device can be turned on or turned off as the command, and the control accuracy of the voltage applied to the winding can be improved. Since the detection value of the midpoint potential by the midpoint potential detection circuit 18 is used, the on-duty error ΔDer can be detected by a simple circuit configuration.

As shown in a next equation, the duty error correction unit 33 calculates each phase of the command on-duties of three-phase Do_u, Do_v, Do_w by adding 0.5 to a value obtained by dividing each of the voltage commands of three-phase Vuo, Vvo, Vwo by the power source voltage Vdc.

$$Do\_u = Vuo/Vdc + 0.5$$

$$Do\_v = Vvo/Vdc + 0.5$$

$$Do\_w = Vwo/Vdc + 0.5 \qquad (1)$$

The duty error correction unit 33 detects the actual on-duty Dr, based on a time point when the midpoint potential becomes larger than the potential threshold value, and a time point when the midpoint potential becomes smaller than the potential threshold value.

In the present embodiment, as the behavior of U phase is shown in FIG. 4, the duty error correction unit 33 measures an off-off period GPR1_u which is a period from a time point when the midpoint potential of the series circuit of U phase becomes smaller than the potential threshold value and the midpoint potential becomes off, to a time point when the midpoint potential becomes off next, with the timer. And, the duty error correction unit 33 measures an off-on period GPR0_u which is a period from a time point when the midpoint potential becomes off, to a time point when the midpoint potential becomes larger than the potential threshold value and the midpoint potential becomes on, with the timer. Then, as shown in a next equation, the duty error correction unit 33 calculates the on period of the positive electrode side switching device by subtracting the off-on period GPR0_u from the off-off period GPR1_u; and detects, as the actual on-duty Dr_u of U phase, a value obtained by dividing the on period of the positive electrode side by the PWM period Tcc.

$$Dr\_u = (GPR1\_u - GPR0\_u)/Tcc$$

$$Dr\_v = (GPR1\_v - GPR0\_v)/Tcc$$

$$Dr\_w = (GPR1\_w - GPR0\_w)/Tcc \qquad (2)$$

As shown in the equation (2), also about V phase, the duty error correction unit 33 calculates the actual on-duty Dr_v of V phase, by measuring the off-on period GPR0_v and the off-off period GPR1_v based on the midpoint potential of the series circuit of V phase. Also about W phase, the duty error correction unit 33 calculates the actual on-duty Dr_w of W phase by measuring the off-on period GPR0_w and the off-off period GPR1_w based on the midpoint potential of the series circuit of W phase.

The duty error correction unit 33 may measure a period from a time point when the midpoint potential becomes on to a time point when the midpoint potential becomes off with the timer, and may measure directly the on period of the positive electrode side switching device.

The duty error correction unit 33 calculates the actual on-duty Dr in this time PWM calculation cycle ((n) in FIG.

4), based on the off-off period GPR1 and the off-on period GPR0 which are measured in the last time PWM calculation cycle ((n−1) in FIG. 4).

The actual on-duty Dr calculated in this time PWM calculation cycle ((n) in FIG. 4) corresponds to the command voltage which is calculated in the PWM calculation cycle before two periods ((n−2) in FIG. 4) and is set at the end time point ((a) in FIG. 4) of the PWM calculation cycle before two periods.

Therefore, as shown in a next equation, about U phase, the duty error correction unit 33 calculates the on-duty error ΔDer_u(n) of this time PWM calculation cycle, by subtracting the actual on-duty Dr_u(n) calculated in this time PWM calculation cycle ((n) in FIG. 4) from the command on-duty Do_u(n−2) calculated in the PWM calculation cycle before two periods ((n−2) in FIG. 4).

$$\Delta Der\_u(n)=Do\_u(n-2)-Dr\_u(n)$$

$$\Delta Der\_v(n)=Do\_v(n-2)-Dr\_v(n)$$

$$\Delta Der\_w(n)=Do\_w(n-2)-Dr\_w(n) \quad (3)$$

Also about V phase and W phase, the duty error correction unit 33 calculates the on-duty errors ΔDer_v, ΔDer_w, based on the actual on-duties Dr_v, Dr_w, and the command on-duties Do_v, Do_w.

<Learning of the On-Duty Error>

The duty error correction unit 33 may reflect each phase of the detected on-duty errors of three-phase ΔDer_u, ΔDer_v, ΔDer_w, on each phase of the voltage commands of three-phase to be set next. However, since the detected on-duty error ΔDer corresponds to the control state of the PWM calculation cycle before two periods, information is delayed. By this method, it is necessary to always detect the all midpoint voltages of three-phase, to always detect the actual on-duties Dr, and to always detect the on-duty errors.

In the present embodiment, the duty error correction unit 33 learns a characteristics of the on-duty error, calculates an on-duty error for correction ΔDerc using the error characteristics after learning, and corrects each phase of the voltage commands of three-phase by the on-duty error for correction ΔDerc.

Figure 6:
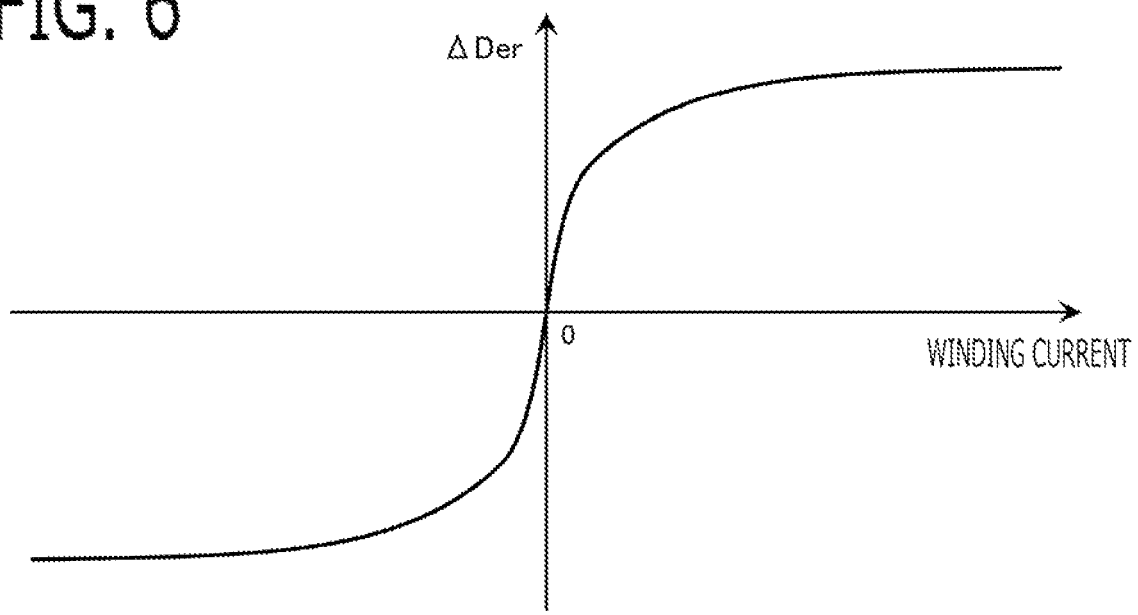
FIG. 6 is a figure for explaining the relation characteristic between the winding current and the on-duty error according to Embodiment 1.

As mentioned above, according to positive or negative of the winding current and the magnitude of the winding current, the on-duty error ΔDer is fluctuated. An example of the on-duty error ΔDer according to this winding current is shown in FIG. 6. As mentioned above, when the winding current is positive, since current flows through the diode of the negative electrode side switching device during the period of the dead time, the actual on-duty Dr decreases by the on-duty corresponding to the dead time less than the command on-duty Do, and the on-duty error ΔDer increases by the on-duty corresponding to the dead time more than the command on-duty Do. However, since the turn-off delay and the turn-on delay change according to the magnitude of the winding current, the on-duty error ΔDer changes according to the operating point of the winding current.

When the winding current is negative, since the current flows through the diode of the positive electrode side switching device during the period of the dead time, the actual on-duty Dr increases by the on-duty corresponding to the dead time more than the command on-duty Do, and the on-duty error ΔDer decreases by the on-duty corresponding to the dead time. However, since the turn-off delay and the turn-on delay change according to the winding current, the on-duty error ΔDer changes according to the operating point of the winding current.

When the winding current is 0, the on-duty error ΔDer becomes 0. Before and after 0 of the winding current, nonlinearity becomes strong. And, as the winding current increases from 0, the on-duty error ΔDer increases rapidly. As the winding current decreases from 0, the on-duty error ΔDer decreases rapidly. Between positive and negative of the winding current, the on-duty error ΔDer becomes characteristics symmetrical with respect to 0 point basically.

Then, the duty error correction unit 33 learns a duty error characteristics that represents a relationship between the winding current and the on-duty error ΔDer, based on a detection value of the winding current and the on-duty error ΔDer. Then, the duty error correction unit 33 calculates the on-duty error for correction ΔDerc corresponding to the detection value of the winding current, by referring to the learned duty error characteristics, and corrects each phase of the voltage commands of three-phase based on the on-duty error for correction ΔDerc.

<The Detection Value of the Winding Current for Learning>

As mentioned above, the actual on-duty Dr calculated in this time PWM calculation cycle ((n) in FIG. 4) corresponds to the command on-duty Do which is calculated in the PWM calculation cycle before two periods ((n−2) in FIG. 4) and is set at the end time point ((a) in FIG. 4) of the PWM calculation cycle before two periods; and it changes according to the winding current in the last time PWM calculation cycle ((n−1) in FIG. 4).

Then, the duty error correction unit 33 uses, as the detection value of the winding current for learning, the detection value of the winding current corresponding to the timing when the actual on-duty Dr was detected. In the present embodiment, the duty error correction unit 33 calculates the detection value of the winding current for learning IL_ud(n) which is made to correspond to the on-duty error ΔDer_u(n) calculated in this time PWM calculation cycle, based on the winding current Iud(n−1) detected at the start time point ((a) in FIG. 4) of the last time PWM calculation cycle and the winding current Iud(n) detected at the start time point ((b) in FIG. 4) of this time PWM calculation cycle. For example, as shown in a next equation, the duty error correction unit 33 calculates using an interpolation coefficient α. The interpolation coefficient α is set to a value between 0 and 1, for example, it is set to 0.5. Also about V phase and W phase, similarly, the detection values of the winding currents for learning IL_v, IL_w are calculated.

$$IL\_u(n)=\alpha \times Iud(n-1)+(1-\alpha)\times Iud(n)$$

$$IL\_v(n)=\alpha \times Ivd(n-1)+(1-\alpha)\times Ivd(n)$$

$$IL\_w(n)=\alpha \times Iwd(n-1)+(1-\alpha)\times Iwd(n) \quad (4)$$

Alternatively, as shown in a next equation, as the detection values of the winding currents for learning IL_u, IL_v, IL_w, the duty error correction unit 33 may use current values IL_ue, IL_ve, IL_we obtained by performing the fixed coordinate conversion and the two-phase/three-phase conversion to the dq-axis current commands Ido, Iqo on the dq-axis rotating coordinate system, based on the magnetic pole position θest corresponding to the timing of detecting the actual on-duty Dr. In the present embodiment, in each PWM calculation cycle, the duty error correction unit 33 estimates the current values using the magnetic pole position θest after one to two cycles (in this example, 1.5 cycles) later than the start time point of the PWM calculation cycle. Then, the duty error correction unit 33 sets the current values IL_ue(n−2), IL_ve(n−2), IL_we(n−2) which were estimated in the PWM calculation cycle before two cycles, to the detection values of the winding currents for learning $IL\_u(n)$, $IL\_v(n)$, $IL\_w(n)$ which are made to correspond to the on-duty error $\Delta Der\_u(n)$ calculated in this time PWM calculation cycle.

$$\begin{bmatrix} IL\_ue \\ IL\_ve \\ IL\_we \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta est & -\sin\theta est \\ \sin\theta est & \cos\theta est \end{bmatrix} \begin{bmatrix} Ido \\ Iqo \end{bmatrix} \quad (5)$$

$$\theta est = \theta + \beta \cdot \omega \cdot Tcc$$

$$\begin{bmatrix} IL\_u(n) \\ IL\_v(n) \\ IL\_w(n) \end{bmatrix} = \begin{bmatrix} IL\_ue(n-2) \\ IL\_ve(n-2) \\ IL\_we(n-2) \end{bmatrix}$$

Herein, θ is the magnetic pole position which is detected at the start time point of each PWM calculation cycle. ω is the rotational angle speed of the magnetic pole position which is detected at the start time point of each PWM calculation cycle. β is a preliminarily set cycle coefficient, for example, it is set to 1.5, and the magnetic pole position θest after 1.5 times cycles of the PWM calculation cycle later than the start time point of each PWM calculation cycle is estimated.

<Learning of Duty Error Characteristics>

Figure 7:
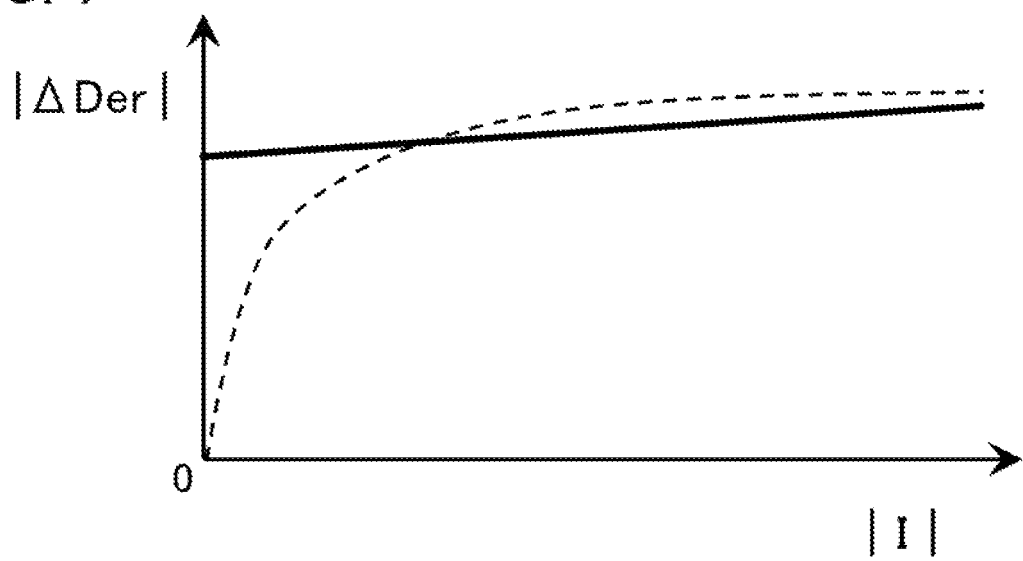
FIG. 7 is a figure for explaining learning of the duty error characteristics according to Embodiment 1.

In the present embodiment, as show in FIG. 7 and a next equation, the duty error correction unit 33 approximates the duty error characteristics at which the winding current is positive and the duty error characteristics at which the winding current is negative, by a linear function; and learns by changing coefficients A, B of the linear function. Herein, A is an inclination, B is an intercept, and I is the winding current.

$$|\Delta Der| = A \times |I| + B \quad (6)$$

Since the duty error characteristics at which the winding current is positive and the duty error characteristics at which the winding current is negative are 0 point symmetry, in order to learn collectively the case where winding current is positive and the case where winding current is negative by one linear function, the relationship between the absolute value of winding current |I| and the absolute value of on-duty error |ΔDer| is learned. Since the duty error characteristics are equivalent between phases, the duty error characteristics of each phase are collectively learned by one linear function.

For example, based on the detection value of the winding current for learning IL and the on-duty error ΔDer calculated in this time PWM calculation cycle, the duty error correction unit 33 updates the coefficients A, B of the linear function using a recursive least-squares method with forgetting coefficient. Based on the detection values of the winding current for learning IL and the on-duty errors ΔDer calculated in a plurality of PWM calculation cycles of this time and the past, the duty error correction unit 33 may update the coefficients A, B of the linear function using the least-squares method. The duty error characteristics may be learned using a higher order polynomial.

<Prohibition of Learning in the Output Impossible Region>

Figure 9:
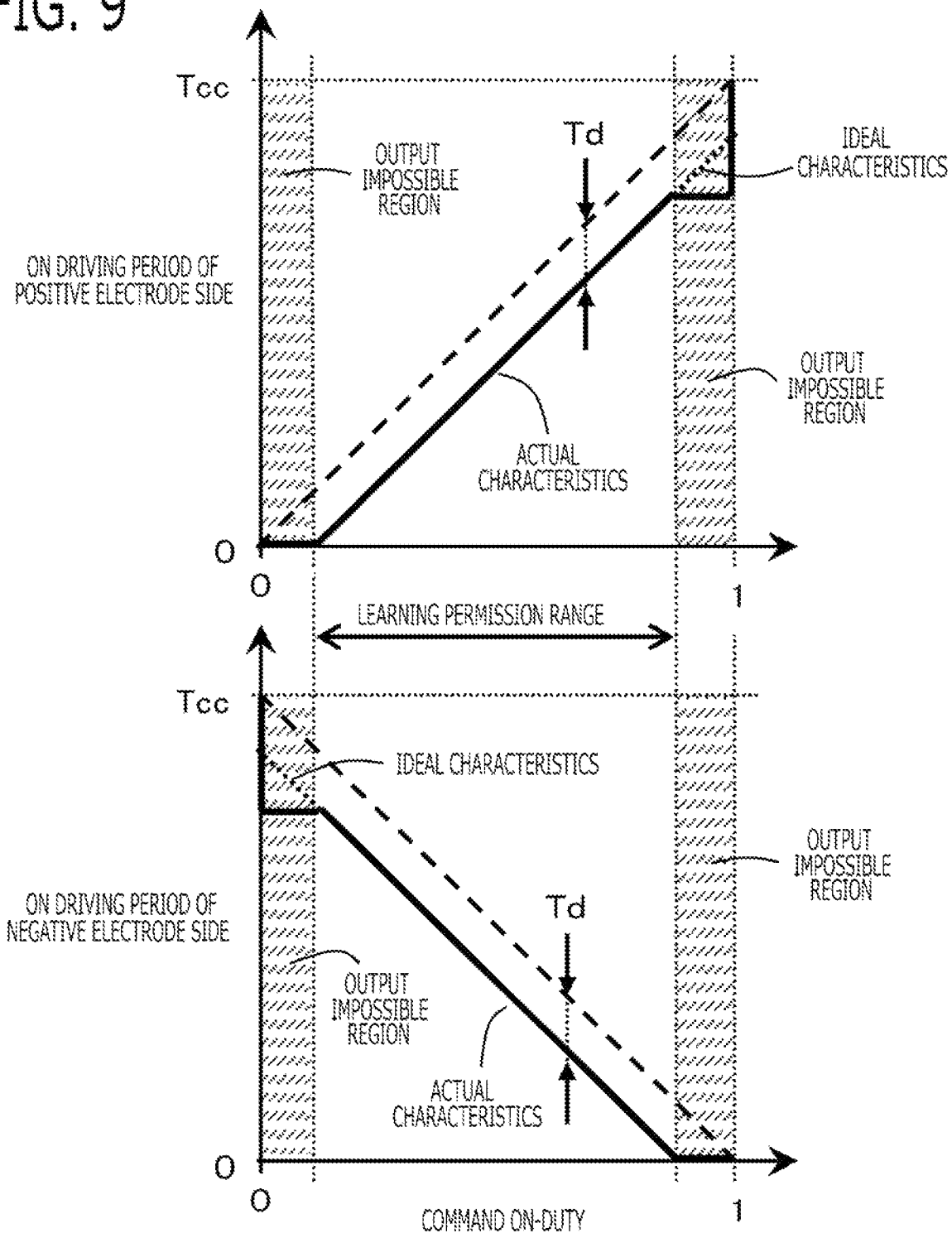
FIG. 9 is a figure for explaining the learning permission range according to Embodiment 1.

FIG. 9 shows graphs of the output impossible region due to the dead time. It is shown that by setting the dead time Td, the output impossible regions occur in the on driving periods of the positive electrode side and the negative electrode side switching devices, with respect to the command on-duty Do.

In the output impossible regions, the on driving periods of the positive electrode side and the negative electrode side switching devices with respect to the command on-duty Do are different from the characteristics of the case where the difference between the command on period and the actual on period becomes the dead time. Therefore, when the command on-duty Do is in the output impossible region, it is desirable not to learn the duty error characteristics. Accordingly, about each phase, the duty error correction unit 33 updates a learning value of the duty error characteristics, when the command on-duty Do is within a preliminarily set learning permission range; and does not update the learning value of the duty error characteristics, when the command on-duty Do is outside the learning permission range.

<Prohibition of Learning when the Winding Current is Around 0>

As explained using FIG. 6, before and after 0 of the winding current, nonlinearity becomes strong, and it cannot be approximated by a linear function. Therefore, as shown in a next equation, the duty error correction unit 33 updates the learning values of the duty error characteristics (in this example, the coefficients A, B of the linear function), when the absolute value of detection value of the winding current for learning IL is greater than or equal to a preliminarily set current threshold THi; and does not update the learning values of the duty error characteristics, when the absolute value of detection value of the winding current for learning IL is less than the current threshold THi.

<Calculation of the On-Duty Error for Correction ΔDerc>

Then, as shown in a next equation, about each phase, when the absolute value of detection value of the winding current is greater than or equal to the current threshold THi, the duty error correction unit 33 calculates the on-duty error for correction ΔDerc corresponding to the detection value of winding current, by referring to the duty error characteristics. Herein, SIGN(X) is a function which outputs a positive or negative sign of the input value X.

When $|Iud| \geq THi$      1)

$\Delta Derc\_u = \text{SIGN}(Iud) \times A \times |Iud| + B$

When $|Ivd| \geq THi$      2)

$\Delta Derc\_v = \text{SIGN}(Ivd) \times A \times |Ivd| + B$

When $|Iwd| \geq THi$      3)

$\Delta Derc\_w = \text{SIGN}(Iwd) \times A \times |Iwd| + B$

When $X \geq 0$, $\text{SIGN}(X) = +1$

When $X < 0$, $\text{SIGN}(X) = -1$      (7)

On the other hand, as shown in a next equation, about each phase, when the absolute value of detection value of the winding current is less than the current threshold THi, the duty error correction unit 33 calculates a correction coefficient K0 corresponding to the detection value of winding current, by referring to a preliminarily set correction coefficient characteristics Fcmp in which a relationship between the winding current and the correction coefficient K0 is preliminarily set; calculates the on-duty error corresponding to the detection value of winding current, by referring to the duty error characteristics; and calculates the final on-duty error ΔDerc by multiplying the correction coefficient K0 to the on-duty error.

When $|Iud| < THi$      1)

$$K0\_u = Fcmp(|Iud|)$$

$$\Delta Derc\_u = \mathrm{SIGN}(Iud) \times K0\_u \times (A \times |Iud| + B)$$

When $|Ivd| < THi$      (2)

$$K0\_v = Fcmp(|Ivd|)$$

$$\Delta Derc\_v = \mathrm{SIGN}(Ivd) \times K0\_v \times (A \times |Ivd| + B)$$

When $|Iwd| < THi$      (3)

$$K0\_w = Fcmp(|Iwd|)$$

$$\Delta Derc\_w = \mathrm{SIGN}(Ivd) \times K0\_w \times (A \times |Iwd| + B) \quad (8)$$

Figure 8:
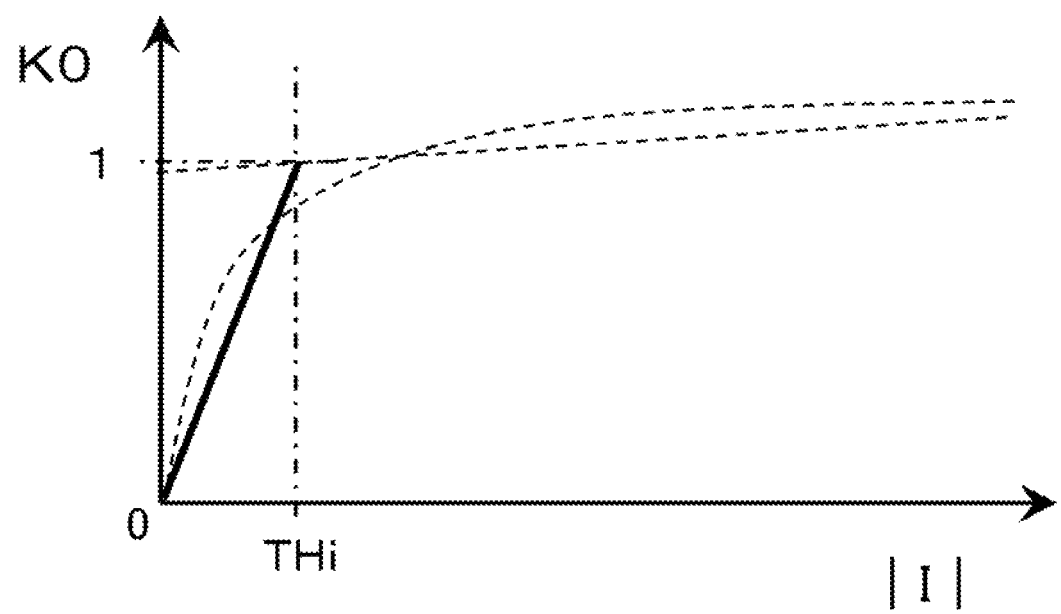
FIG. 8 is a figure for explaining the correction coefficient characteristics according to Embodiment 1.

Herein, Fcmp( ) is a function of the correction coefficient characteristics in which the absolute value of winding current is an input variable. And, as shown in FIG. 8, when the absolute value of winding current is the current threshold THi, 1 is outputted; when the absolute value of winding current is 0, 0 is outputted; and between both points is interpolated. In the present embodiment, the correction coefficient characteristics Fcmp is a linear function whose inclination is 1/THi and whose intercept is 0. The correction coefficient characteristics may be a high order function or table data.

As each phase of the detection values of winding currents Iud, Ivd, Iwd used in the equation (7) and the equation (8), the estimation value of winding current at the timing when the switching device is actually turned on and off based on the voltage command after correction may be used. Specifically, as shown in the first equation and the second equation of the equation (5), as each phase of the detection values of winding currents Iud, Ivd, Iwd, the duty error correction unit 33 may use current values IL_ue, IL_ve, IL_we obtained by performing the fixed coordinate conversion and the two-phase/three-phase conversion to the dq-axis current commands Ido, Iqo on the dq-axis rotating coordinate system, based on the magnetic pole position θest. The magnetic pole position θest is set to the magnetic pole position corresponding to the timing when the switching device is actually turned on and off based on the voltage command after correction. β is set to a value between 1 to 2 (in this example, 1.5). Then, the duty error correction unit 33 uses the current values IL_ue, IL_ve, IL_we which are estimated in this time PWM calculation cycle, as the detection values of winding currents Iud, Ivd, Iwd, respectively.

Then, as shown in a next equation, the duty error correction unit 33 calculates the voltage commands of three-phase Vuo, Vvo, Vwo, by adding values obtained by multiplying the power source voltage Vdc to the on-duty errors for correction of three-phase ΔDerc_u, ΔDerc_v, ΔDerc_w, to the base voltage commands of three-phase Vuob, Vvob, Vwob, respectively. Then, the PWM control unit 34 controls on/off of the switching devices based on the voltage commands of three-phase after correction Vuo, Vvo, Vwo.

$$Vuo = Vuob + \Delta Derc\_u \times Vdc$$

$$Vvo = Vvob + \Delta Derc\_v \times Vdc$$

$$Vwo = Vwob + \Delta Derc\_w \times Vdc \quad (9)$$

2. Embodiment 2

Next, the controller 1 according to Embodiment 2 will be explained. The explanation for constituent parts the same as those in Embodiment 1 will be omitted. The basic configuration of the controller 1 according to the present embodiment is the same as that of Embodiment 1. Embodiment 2 is different from. Embodiment 1 in that the PWM control unit 34 generates the PWM signal based on a comparison result between the command on-duty Do calculated from each phase of the command voltages of three-phase and a carrier wave, and the duty error correction unit 33 corrects the command on-duty Do based on the on-duty error.

Figure 10:
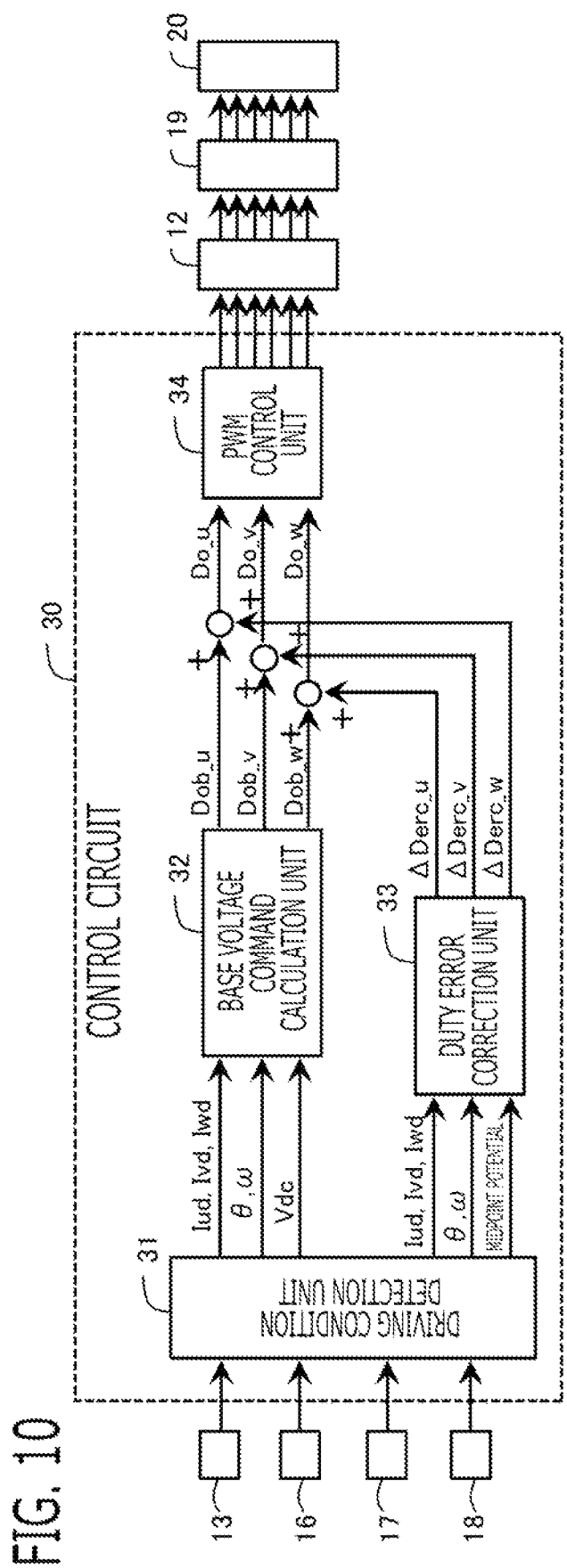
FIG. 10 is a block diagram of the control circuit according to Embodiment 2.

FIG. 10 shows the block diagram of the controller 1 according to the present embodiment. As shown in a next equation, the base voltage command calculation unit 32 calculates the base command on-duties of three-phase Dob_u, Dob_v, Dob_w, by adding 0.5 to values obtained by dividing the base voltage commands of three-phase Vuob, Vvob, Vwob calculated using the similar method as the above Embodiment 1, by the power source voltage Vdc, respectively.

$$Dob\_u = Vuob/Vdc + 0.5$$

$$Dob\_v = Vvob/Vdc + 0.5$$

$$Dob\_w = Vwob/Vdc + 0.5 \quad (10)$$

By the similar method as Embodiment 1, the duty error correction unit 33 calculates the on-duty errors for correction of three-phase ΔDerc_u, ΔDerc_v, ΔDerc_w. Then, as shown in a next equation, the duty error correction unit 33 calculates the command on-duties of three-phase Do_u, Do_v, Do_w, by adding the on-duty errors for correction of three-phase ΔDerc_u, ΔDerc_v, ΔDerc_w, to the base command on-duties of three-phase Dob_u, Dob_v, Dob_w, respectively.

$$Do\_u = Dob\_u + \Delta Derc\_u$$

$$Do\_v = Dob\_v + \Delta Derc\_v$$

$$Do\_w = Dob\_w + \Delta Derc\_w \quad (11)$$

The PWM control unit 34 controls on/off of the switching devices based on the command on-duties of three-phase after correction Do_u, Do_v, Do_w, respectively. The PWM control unit 34 generates the PWM signals which turn on or off the switching devices, based on the comparison results between the commands on duties of three-phase Do_u, Do_v, Do_w and the carrier wave CA, respectively. In the present embodiment, the carrier wave CA is a triangular wave which vibrates between 0 and 1 with a PWM cycle Tcc. The PWM signal is turned on when the command on-duty Do exceeds the carrier wave CA, and the PWM signal is turned off when the command on-duty Do is less than the carrier wave CA. As similar to Embodiment 1, about each phase, the PWM control unit 34 turns on the positive electrode side switching device and the negative electrode side switching device alternately, while interposing the dead time.

3. Embodiment 3

Next, the controller 1 according to Embodiment 3 will be explained. The explanation for constituent parts the same as those in Embodiment 1 will be omitted. The basic configuration of the controller 1 according to the present embodiment is the same as that of Embodiment 1. Embodiment 3 is different from Embodiment 1 in that the duty error correction unit 33 learns the duty error characteristics individually between when the winding current is positive and when the winding current is negative.

The driving signal of the gate drive circuit 12 is inputted into the gate terminal of the switching device via the redundant three-phase short circuit 19. Therefore, the turn-off delay and the turn-on delay due to the intervention of the redundant three-phase short circuit 19 occur. Especially, when the redundant three-phase short circuit 19 performs the forcible drive to the driving signals of the positive electrode side switching devices of three-phase, or performs the forcible drive to the driving signals of the negative electrode side switching devices of three-phase, the turn-off delay and the turn-on delay are different between the switching devices which are intervened by the redundant three-phase short circuit 19 and the switching devices not intervened. Irrespective of presence or absence of the redundant three-phase short circuit 19, the turn-off delay and the turn-on delay may be different between the positive electrode side switching devices and the negative electrode side switching devices, due to characteristic differences. Therefore, since the duty error characteristics changes between when the winding current is positive and when the winding current is negative, correction accuracy can be increased by learning individually.

In the present embodiment, as shown in an equation (12), the duty error correction unit 33 learns a duty error characteristics for positive, when the winding current I is positive; and learns a duty error characteristics for negative, when the winding current I is negative. The duty error correction unit 33 learns by changing coefficients of the linear function for positive Ap, Bp, and coefficients of the linear function for negative An, Bn.

When $I>=0$     1)

$|\Delta Der|=Ap\times|I|+Bp$

When $I<0$     2)

$|\Delta Der|=An\times|I|+Bn$     (12)

For example, the duty error correction unit 33 updates the coefficients of the linear function for positive Ap, Bp using a recursive least-squares method with forgetting coefficient, based on the detection value of winding current for learning IL and the on-duty error ΔDer, when the detection value of winding current for learning IL is positive; and updates the coefficients of the linear function for negative An, Bn using a recursive least-squares method with forgetting coefficient, based on the detection value of winding current for learning IL and the on-duty error ΔDer, when the detection value of winding current for learning IL is negative.

Then, as shown in a next equation, about each phase, when the absolute value of detection value of the winding current is greater than or equal to the current threshold THi, the duty error correction unit 33 calculates the on-duty error for correction ΔDerc corresponding to the detection value of winding current, by referring to the duty error characteristics for positive or for negative selected according to positive or negative of the detection value of winding current.

When $|Iud|>=THi$     1)

When $Iud>=0$, $\Delta Derc\_u=Ap\times|Iud|+Bp$

When $Iud<0$, $\Delta Derc\_u=-(An\times|Iud|+Bn)$

When $|Ivd|>=THi$     2)

When $Ivd>=0$, $\Delta Derc\_v=Ap\times|Ivd|+Bp$

When $Ivd<0$, $\Delta Derc\_v=-(An\times|Ivd|+Bn)$

When $|Iwd|>=THi$     3)

When $Iwd>=0$, $\Delta Derc\_w=Ap\times|Iwd|+Bp$

When $Iwd<0$, $\Delta Derc\_w=-(An\times|Iwd|+Bn)$     (13)

On the other hand, as shown in a next equation, about each phase, when the absolute value of detection value of the winding current is less than the current threshold THi, the duty error correction unit 33 calculates a correction coefficient K0 corresponding to the detection value of winding current, by referring to a preliminarily set correction coefficient characteristics Fcmp in which a relationship between the winding current and the correction coefficient K0 is preliminarily set; calculates the on-duty error corresponding to the detection value of winding current, by referring to the duty error characteristics for positive or for negative selected according to positive or negative of the detection value of winding current; and calculates the final on-duty error ΔDerc by multiplying the correction coefficient K0 to the on-duty error.

When $|Iud|<THi$     1)

$K0\_u=Fcmp(|Iud|)$

When $Iud>=0$, $\Delta Derc\_u=K0\_u\times Ap\times|Iud|+Bp$

When $Iud<0$, $\Delta Derc\_u=-K0\_u\times(An\times|Iud|+Bn)$

When $|Ivd|<THi$     2)

$K0\_v=Fcmp(|Ivd|)$

When $Ivd>=0$, $\Delta Derc\_v=K0\_v\times Ap\times|Ivd|+Bp$

When $Ivd<0$, $\Delta Derc\_v=-K0\_v\times(An\times|Ivd|+Bn)$

When $|Iwd|<THi$     3)

$K0\_w=Fcmp(|Iwd|)$

When $Iwd>=0$, $\Delta Derc\_w=K0\_w\times Ap\times|Iwd|+Bp$

When $Iwd<0$, $\Delta Derc\_w=-K0\_w\times(An\times|Iwd|+Bn)$     (14)

4. Embodiment 4

Next, the controller 1 according to Embodiment 4 will be explained. The explanation for constituent parts the same as those in Embodiment 1 will be omitted. The basic configuration of the controller 1 according to the present embodiment is the same as that of Embodiment 3. Embodiment 4 is different from Embodiment 1 in that the duty error correction unit 33 divides time in a plurality of periods, and obtains data for learning of phase which is set in each period.

In the present embodiment, the duty error correction unit 33 divides time in a plurality of periods; sets, to each period, one phase of which the winding current becomes positive, and one phase of which the winding current becomes negative; about two phases which are set in each period, detects the actual on-duty Dr based on the detection value of the midpoint potential; calculates an on-duty error ΔDer based on a difference between the command on-duty Do and the actual on-duty Dr; and updates a learning value of the duty error characteristics based on the detection value of the winding current and the on-duty error ΔDer.

Figure 12:
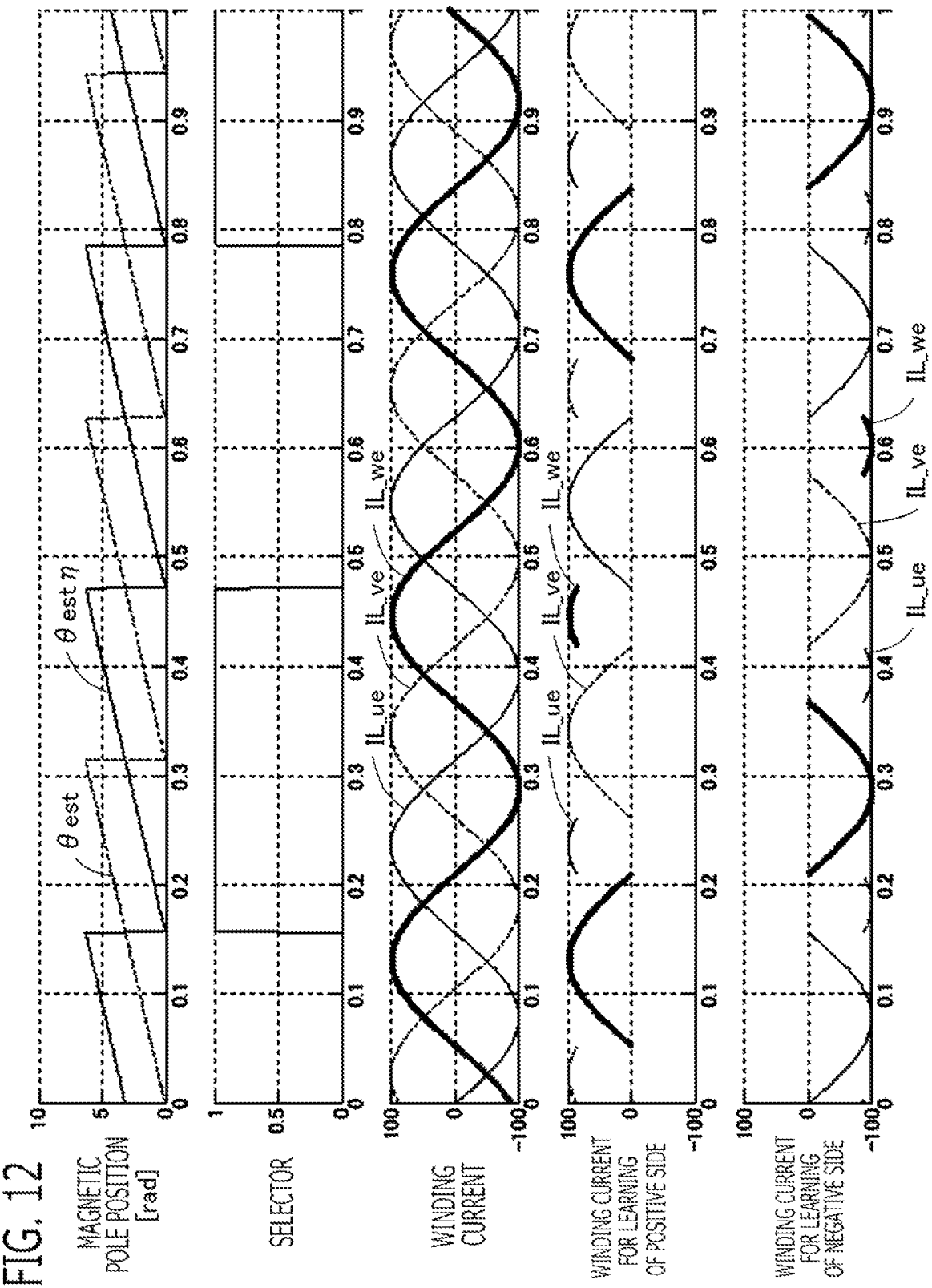
FIG. 12 is a time chart for explaining setting of time division according to Embodiment 4.

In the present embodiment, as shown in FIG. 11 and FIG. 12, the duty error correction unit 33 divides a time interval in which the magnetic pole position rotates 720 degrees into 12 periods of 60 degrees; and sets, to each period, one phase in which the detection value of winding current for learning IL becomes positive and one phase in which the detection value of winding current for learning IL becomes negative. The phase of each period is set so that there is no deviation of the period number between phases. In the present embodiment, the periods are divided so that the magnetic pole position becomes 0 when the detection value of winding current for learning of U phase IL_u, IL_ue becomes 0, based on an adjusted magnetic pole position θestη (=θest+ η+π) [rad] adjusted by an offset value η. Using a next equation, the offset value η is calculated based on the dq-axis currents command Ido, Iqo. In order to simplify explanation, [rad] and [degree] are used, but, both are ones in which unit is simply converted.

$$\theta est\eta = \theta est + \eta + \pi \qquad (15)$$

$$\eta = \tan^{-1}\left(-\frac{Ido}{Iqo}\right)$$

According to this configuration, the phase number of which data for learning is calculated in the same period can be decreased to two phases of one phase whose winding current is positive and one phase whose winding current is negative, and arithmetic load can be reduced. And, since the data for learning of the phase in which the winding current is positive and the phase in which the winding current is negative can be calculated in the same period, the update of the learning value of the duty error characteristics for positive and the update of the learning value of the duty error characteristics for negative can be performed without deviation.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where it is three-phase of n=3. However, n may be set to two or more any natural numbers, for example, n=2 or 4.

(2) In each of the above-mentioned Embodiments, there been explained the case where the duty error correction unit 33 learns the common duty error characteristics between phases. However, the duty error correction unit 33 may learn the duty error characteristics of each phase individually. According to this configuration, the individual difference of the switching device between phases can be learned.

(3) In each of the above-mentioned Embodiments, there has been explained the case where the midpoint potential detection circuit 18 detects the midpoint voltages of the series circuits of all three-phase, and the duty error correction unit 33 detects the actual on-duties of three-phase, and calculates the data for learning. However, the midpoint potential detection circuit 18 may be a circuit which detects the midpoint voltage of the series circuit of only 1 phase capable of detecting the midpoint voltage. The duty error correction unit 33 may calculate the data for learning by detecting the actual on-duty of only 1 phase capable of detecting the midpoint voltage; may learn the duty error characteristics based on the data for learning of only 1 phase capable of detecting the midpoint voltage; and may use the learned duty error characteristics for calculation of the on-duty errors for correction ΔDerc of three-phase. According to this configuration, when the individual difference of the switching device between phases is small, the circuit configuration of the midpoint potential detection circuit 18 can further be simplified, and the arithmetic load of the data for learning can be reduced.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Controller for AC Rotary Electric Machine, 2 AC Rotary Electric Machine, 10 DC power Source, 17 Current Detection Circuit, 18 Midpoint Potential Detection Circuit, 19 Redundant Three-phase Short Circuit, 20 Inverter, 22 Diode, 23H Positive Electrode Side Switching Device, 23L Negative Electrode Side Switching Device, 30 Control Circuit, 31 Driving Condition Detection Unit, 32 Base Voltage Command Calculation Unit, 33 Duty Error Correction Unit, 34 PWM Control Unit, Do Command On-duty, Dr Actual On-duty, Fcmp Correction Coefficient Characteristics, IL Detection Value of Winding Current, K0 Correction Coefficient, THi Current Threshold, ΔDer On-duty Error

What is claimed is:

1. A controller for AC rotary electric machine that controls an AC rotary electric machine which is provided with n-phase windings (n is a natural number of greater than or equal to two), the controller for AC rotary electric machine comprising:

an inverter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a midpoint potential detection circuit that detects a midpoint potential which is a potential of the connection node of series connection in the series circuit of each phase; and a control circuit that controls on/off of the switching devices, based on command on-duties calculated from voltage commands, or the voltage commands, wherein the control circuit detects an actual on-duty of the switching device, based on a detection value of the midpoint potential, calculates an on-duty error based on a difference between the command on-duty and the actual on-duty, and corrects the voltage command or the command on-duty based on the on-duty error, wherein the controller for AC rotary electric machine further comprises a current detection circuit that detects a winding current which flows into the winding of each phase, wherein the control circuit learns a duty error characteristic that represents a relationship between the winding current and the on-duty error, based on a detection value of the winding current and the on-duty error, calculates the on-duty error corresponding to the detection value of the winding current, by referring to the learned duty error characteristic, and corrects the voltage command or the command on-duty, based on the calculated on-duty error, wherein the control circuit approximates the duty error characteristic at which the winding current is positive, and the duty error characteristic at which the winding current is negative, by a linear function, and learns by changing coefficients of the linear function.

2. The controller for AC rotary electric machine according to claim 1, wherein when learning the duty error characteristic, the control circuit uses the detection value of the winding current corresponding to a timing when the actual on-duty is detected.

3. The controller for AC rotary electric machine according to claim 1, wherein the control circuit uses, as the detection value of the winding current used for learning of the duty error characteristic, a current value obtained by performing a fixed coordinate conversion and a two-phase/three-phase conversion to dq-axis current commands on a dq-axis rotating coordinate system based on a magnetic pole position corresponding to a timing when the actual on-duty is detected.

4. The controller for AC rotary electric machine according to claim 1, wherein the control circuit uses, as the detection value of the winding current used when calculating the on-duty error by referring to the duty error characteristic, a current value obtained by performing a fixed coordinate conversion and a two-phase/three-phase conversion to dq-axis current commands on a dq-axis rotating coordinate system based on a magnetic pole position corresponding to a timing when the switching device is actually turned on and off based on the voltage command after correction or the command on-duty after correction.

5. The controller for AC rotary electric machine according to claim 1, wherein the control circuit updates a learning value of the duty error characteristic, when the command on-duty is within a preliminarily set learning permission range, and does not update the learning value of the duty error characteristic, when the command on-duty is outside the learning permission range.

6. The controller for AC rotary electric machine according to claim 1, wherein the control circuit divides a time interval in which a magnetic pole position rotates 720 degrees in 12 periods of 60 degrees; sets, to each period, one phase of which the winding current becomes positive, and one phase of which the winding current becomes negative; about two phases which is set in each period, detects the actual on-duty based on the detection value of the midpoint potential, calculates the on-duty error based on the difference between the command on-duty and the actual on-duty; and updates a learning value of the duty error characteristic based on the detection value of the winding current and the on-duty error.

7. The controller for AC rotary electric machine according to claim 1, wherein the midpoint potential detection circuit is a circuit which turns on or turns off an output signal, according to whether the midpoint potential is larger or smaller than a potential threshold value.

8. The controller for AC rotary electric machine according to claim 1, wherein the control circuit detects the actual on-duty, based on a time point when the midpoint potential becomes larger than a potential threshold value, and a time point when the midpoint potential becomes smaller than the potential threshold value.

9. The controller for AC rotary electric machine according to claim 1, wherein about each phase, the control circuit turns on the positive electrode side switching device and the negative electrode side switching device alternately, while interposing a dead time;

about each phase, the control circuit sets an on driving period of the positive electrode side switching device so as to be shorter than an ON driving period corresponding to the command on-duty, by the dead time; and sets an off driving period of the negative electrode side switching device so as to be longer than an ON driving period corresponding to the command on-duty, by the dead time.

10. The controller for AC rotary electric machine according to claim 9, wherein about each phase, the control circuit generates a PWM signal which is turned on and off at the command on-duty; turns off the negative electrode side switching device, when the PWM signal becomes on; turns on the positive electrode side switching device, when the dead time elapses after the PWM signal becomes on; turns off the positive electrode side switching device, when the PWM signal becomes off; and turns off the negative electrode side switching device, when the dead time elapses after the PWM signal becomes off.

11. The controller for AC rotary electric machine according to claim 1, wherein the control circuit updates an intercept and an inclination as the coefficients of the linear function using a recursive least-squares method, based on the detection value of the winding current and the on-duty error.

12. A controller for AC rotary electric machine that controls an AC rotary electric machine which is provided with n-phase windings (n is a natural number of greater than or equal to two), the controller for AC rotary electric machine comprising:

an inverter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a midpoint potential detection circuit that detects a midpoint potential which is a potential of the connection node of series connection in the series circuit of each phase; and a control circuit that controls on/off of the switching devices, based on command on-duties calculated from voltage commands, or the voltage commands, wherein the control circuit detects an actual on-duty of the switching device, based on a detection value of the midpoint potential, calculates an on-duty error based on a difference between the command on-duty and the actual on-duty, and corrects the voltage command or the command on-duty based on the on-duty error, wherein the controller for AC rotary electric machine further comprises a current detection circuit that detects a winding current which flows into the winding of each phase, wherein the control circuit learns a duty error characteristic that represents a relationship between the winding current and the on-duty error, based on a detection value of the winding current and the on-duty error, calculates the on-duty error corresponding to the detection value of the winding current, by referring to the learned duty error characteristic, and corrects the voltage command or the command on-duty, based on the calculated on-duty error, wherein the control circuit updates a learning value of the duty error characteristic, when an absolute value of the detection value of the winding current is greater than or equal to a preliminarily set current threshold, and does not update the learning value of the duty error characteristic, when the absolute value of the detection value of the winding current is less than the current threshold, wherein about each phase, when the absolute value of the detection value of the winding current is greater than or equal to the current threshold, the control circuit calculates the on-duty error corresponding to the detection value of the winding current by referring to the duty error characteristic; and about each phase, when the absolute value of the detection value of the winding current is less than the current threshold, the control circuit calculates a correction coefficient corresponding to the detection value of the winding current, by referring to a correction coefficient characteristic in which a relationship between the winding current and the correction coefficient is preliminarily set, calculates the on-duty error corresponding to the detection value of the winding current, by referring to the duty error characteristic, and calculates the final on-duty error by multiplying the correction coefficient to the on-duty error, wherein, in the correction coefficient characteristic, when the absolute value of the detection value of the winding current is 0, the correction coefficient becomes 0, when the absolute value of the detection value of the winding current is the current threshold, the correction coefficient becomes 1, and as the absolute value of the detection value of the winding current increases from 0 to the current threshold, the correction coefficient increases from 0 to 1.

* * * * *